March 1, 1932. E. R. MORTON 1,847,191
CONTROL SYSTEM
Filed Nov. 18, 1930
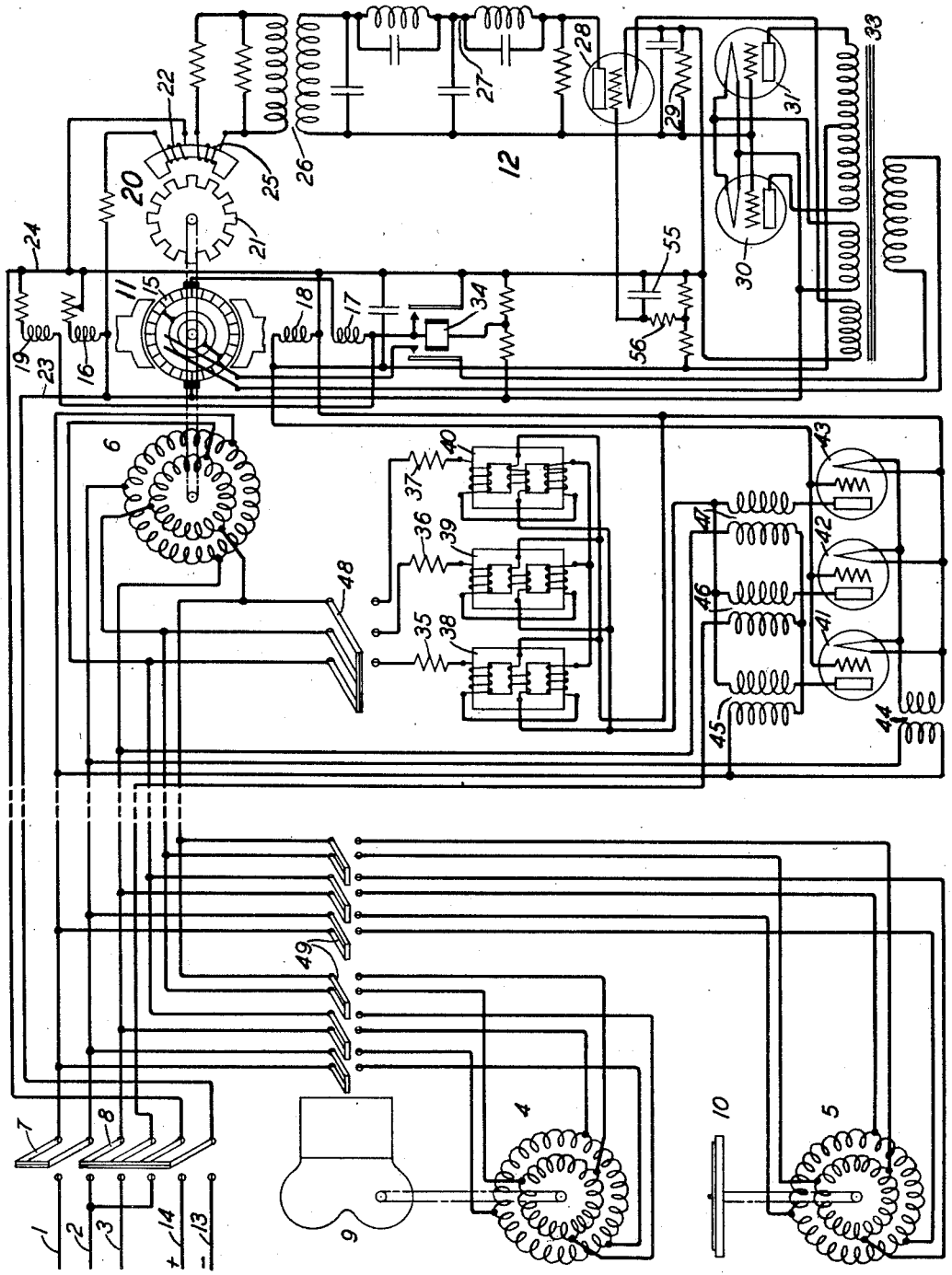
INVENTOR
E. R. MORTON
BY
Wayne B Wells
ATTORNEY Patented Mar. 1, 1932

1,847,191

UNITED STATES PATENT OFFICE

EDMUND R. MORTON, OF NEW YORK, N. Y., ASSIGNOR TO BELL TELEPHONE LABORATORIES, INCORPORATED, OF NEW YORK, N. Y., A CORPORATION OF NEW YORK

CONTROL SYSTEM

Application filed November 18, 1930. Serial No. 496,498.

This invention relates to control systems for operating a plurality of dynamo-electric machines in synchronism and particularly to control systems for operating electrically interlocked dynamo-electric machines as induction motors.

One object of the invention is to provide a control system having a plurality of dynamo-electric machines operated in synchronism with improved means for distributing the load of driving the machines between the machines.

Another object of the invention is to provide a control system having a plurality of alternating current dynamo-electric machines electrically interlocked to rotate in synchronism, a motor for propelling one of said alternating current machines and control means for operating the propelling motor at constant speed that shall have improved means for automatically developing torque by said machines to an extent dependent upon the operation of the control means.

A further object of the invention is to provide a control system having a plurality of dynamo-electric machines operated in synchronism that shall operate one of the machines at constant speed and automatically develop torque by all said machines according to operating conditions of the system.

In making a moving picture record simultaneously with a sound record where an operating motor is provided for the moving picture machine and a separate motor is provided for the sound recording machine, it is essential to operate the motors synchronously and at constant speed. In the patent to C. J. A. Michalke No. 684,579, dated October 15, 1901, is disclosed a system wherein the stator windings of the motors are connected in parallel circuit relation to a three-phase generator and the rotor windings are connected together in parallel circuit relation, whereby the movement of any rotor is followed synchronously by all the other rotors. The system disclosed hereinafter is in some respects similar to the system disclosed in the Michalke patent as to the connections of the stator and rotor windings. In the present system it is essential to drive all the motors at constant speed. In order to obtain a sound picture of good quality a propelling motor is directly connected to one of the motors in the synchronous system and such propelling motor is operated at constant speed so as to operate all the motors in the synchronous system at constant speed. A system of this type is disclosed in the application of E. R. Morton, Serial No. 306,821, filed September 19, 1928.

In the system disclosed in the E. R. Morton application resistance elements are connected in parallel with the rotor windings in order to operate the motors of the synchronous system as induction motors and relieve the constant speed propelling motor of a portion of the load carried thereby. However, in the system disclosed in the Morton application no provision is made for automatically adjusting the value of the resistance elements in parallel with the rotor windings so as to control the torque developed by the motors in the synchronous system when acting as induction motors.

In a system provided with a single constant speed propelling motor for driving all the motors in the synchronous system trouble may be encountered at times by reason of overloading the propelling motor. In accordance with the present invention the machines in the synchronous system develop torque by induction motor action in accordance with the operation of the propelling motor. In the illustrated system the propelling motor is provided with a control system of the type disclosed in the H. M. Stoller Patent 1,662,085, dated March 13, 1928. According to the system disclosed in the Stoller patent the propelling motor is provided with a regulating field winding, the current flow through which is controlled to maintain the motor speed constant. The present invention provides means for regulating the value of the resistance in parallel with the rotor windings of the motors in the synchronous system according to the current flow through the regulating field winding of the propelling motor.

According to the present invention resistance elements are connected in parallel to the rotor windings of the motors in the synchronous system and adjustable reactance elements are connected in series with the resistance elements. The reactance elements comprise direct current and alternating current windings which are mounted on the same core member. The alternating current windings are in series with the resistance elements and develop inductance for controlling the current flow through the resistance elements. The direct current windings control the saturation of the core members and accordingly the inductance developed by the alternating current windings. The current flow through the direct current windings is controlled by space discharge devices which are governed according to the potential across the regulating winding of the propelling motor. The reactance elements employed are of the type disclosed in the patent to H. M. Stoller et al. No. 1,662,083 dated March 13, 1928.

The term "synchronous" when used in describing the operation of the motors is to be understood as referring to the synchronous operation of the motors with respect to each other and not to the synchronous operation of the motors with respect to the frequency of any source of current.

The single figure in the accompanying drawing is a diagrammatic view of a motor control system constructed in accordance with the invention.

Referring to the drawing, a three-phase supply circuit comprising conductors 1, 2 and 3 is connected to dynamo-electric machines or motors 4, 5 and 6 by means of a two-pole switch 7 and a four-pole switch 8. The motors 4, 5 and 6 are provided with stator and rotor windings, the stator windings being connected to the three-phase supply circuit. The motor 4 is shown connected to a camera 9 and the motor 5 is shown connected to a phonograph or sound recording machine 10. Although only two motors are shown for operating cameras and phonographs, it is to be understood that any desired number of such motors may be provided. The machine 6 is similar in construction to the motors 4 and 5 and is operated at constant speed as will be hereinafter described for operating the motors 4 and 5 at constant speed. The machine 6 by reason of the function performed thereby will be designated as a distributor.

The rotor windings of the machines 4, 5 and 6 are connected in parallel circuit relation and the stator windings of the machines are connected in parallel circuit relation to the supply circuit, so that movement of any rotor is synchronously followed by all the other rotors. As before set forth a system of this type is disclosed in the Michalke patent.

The rotor of the distributor 6 is operated by means of a direct current motor 11 and the motor 11 is governed by means of a regulator system 12 of the type disclosed in the above mentioned patent to H. M. Stoller No. 1,662,085. A direct current supply circuit comprising conductors 13 and 14 is connected to the motor 11 by means of the four-pole switch 8. The motor 11 comprises an armature 15, a shunt field winding 16, a series field winding 17, a regulating field winding 18 and an auxiliary series field winding 19 which is used only during the starting of the motor.

An induction generator 20 is directly connected to the motor 11 for developing an alternating current having a frequency which varies according to the speed of the motor. The generator 20 is provided with a toothed rotor 21, a field winding 22 which is connected across the direct current conductors 23 and 24 and an armature winding 25. Inasmuch as the control of a motor by means of the generator 20 is described in detail in the above mentioned patent to H. M. Stoller, No. 1,662,085, only a brief description will be given here of the operation of such regulating system.

The armature winding 25 of the pilot generator is connected by a transformer 26 to a low-pass filter 27. The low-pass filter has a cutoff a little below the normal frequency of the pilot generator. The output from the filter is impressed on the plate of a three-electric space discharge device 28. The device 28 serves as a rectifier for impressing potential from the filter 27 across a coupling resistance 29. Two three-element thermionic regulator tubes 30 and 31 have their input circuits connected across the coupling resistance 29 in circuit with the direct current supply conductors 23 and 24. The direct current from the conductors 23 and 24 impresses a positive potential on the grids of the regulator tubes 30 and 31, whereas the coupling resistance 29 impresses a negative potential on the grids of the tubes. The output circuits of the regulator tubes 30 and 31 are connected to the regulating winding 18 of the motor 11 in series with the direct current supply conductors 23 and 24. A transformer 33 is provided for supplying A. C. heating current to the rectifier tube 28 and the two regulator tubes 30 and 31. The transformer 33 also supplies alternating plate potential to the regulator tubes 30 and 31. The primary winding of the transformer 33 is connected to two slip rings on the motor 11 connected to opposite commutator segments.

When the switch 8 is closed for supplying direct current to the motor 11 the auxiliary series field winding 19 is connected across the conductors 23 and 24 in series with the series field winding 17 and the armature of the motor. When the motor develops sufficient counter-electromotive force, a relay 34 is operated for excluding the auxiliary field winding 19 from circuit and for connecting the series field winding 17 directly to the supply conductor 24. The relay 34 also connects the primary windings of transformer 33 to the slip rings of the motor. Further description of the operation of the motor 11 and the pilot generator 20 is deemed unnecessary in view of the disclosure in the Stoller patent.

Three resistance elements 35, 36 and 37 are connected in parallel with the rotor windings of the distributor 6 and the motors 4 and 5. In series with the resistance elements 35, 36 and 37 are connected three reactance elements 38, 39 and 40. The reactance elements 38, 39 and 40 are each provided with two alternating current windings and one direct current winding mounted on a single core member. The alternating current windings of the reactance elements 38, 39 and 40 are connected in series with the resistance elements 35, 36 and 37 in order to control the current flow through such resistance elements. The reactance elements 38, 39 and 40 are of the saturating core type such as disclosed in the patent to H. M. Stoller et al., No. 1,662,083, dated March 13, 1928.

The current flow through the direct current windings of the reactance elements which control the reactance of such elements is governed by three space discharge devices 41, 42 and 43. The input circuits of the space discharge devices 41, 42 and 43 are connected in parallel across the regulating field winding 18 of the propelling motor 11 so that the grids of the device are connected to the negative side and the filaments to the positive side of the regulating field winding. Filament heating current for the devices 41, 42 and 43 is supplied from the conductors 1 and 2 by means of the two-pole switch 7 and transformer 44. Plate potential for the devices 41, 42 and 43 is supplied from the conductors 1, 2 and 3 by the switches 7 and 8 and transformers 45, 46 and 47. The direct current windings of the reactance elements 38, 39 and 40 are connected in the plate circuits of the space discharge devices 41, 42 and 43. A switch 48 is shown for connecting the resistance elements 35, 36 and 37 and the reactance elements 38, 39 and 40 to the rotors of the distributor 6 and the motors 4 and 5. Suitable switches 49 are shown for connecting the windings of the motors 4 and 5 in parallel to the windings of the distributor 6.

Before starting the operation of the propelling motor 11, the switch 7 is closed for impressing single phase current from the conductors 1 and 2 on the stator windings of the distributor 6 and the motors 4 and 5. The impressing of single phase current on such stator windings aligns the rotors of the distributor and the motors 4 and 5 in set position with respect to each other. The closing of the switch 7 also supplies heating current to the filaments of the space discharge devices 41, 42 and 43. No plate current is supplied to the discharge tubes 41, 42 and 43 at this time as it is undesirable to place plate voltage on the cold discharge devices.

The switch 8 is closed for supplying direct current from the supply conductors 14 and 15 to the propelling motor 11 and to the regulating system 12 which controls the propelling motor 11. The switch 8 in combination with the switch 7 supplies three-phase current to the stator windings of the distributor 6 and the motors 4 and 5 and supplies potential to the plates of the space discharge tubes 41, 42 and 43. At this time the grids of the space discharge tubes 41, 42 and 43 are connected to the negative side of the motor regulating field winding 18, but as there is no current in the regulating field during the early part of the starting period, the space discharge tubes 41, 42 and 43 will draw maximum current. The maximum current flow through the tubes 41, 42 and 43 causes maximum current to flow through the direct current windings of the reactance elements 38, 39 and 40 for saturating the reactors to permit the resistance elements 35, 36 and 37 to draw considerable in-phase current. The current flow through the resistance elements 35, 36 and 37 serves to effect operation of the motors 4 and 5 and the distributors 6 as induction motors to lighten the load carried by the propelling motor 11.

When the propelling motor 11 which drives the interlocked motors is accelerated to nearly full speed, the control system operates and supplies the regulating field winding 18 with current which causes an IR drop across it. The IR drop across the regulating winding 18 impresses negative potential on the grids of the space discharge devices 41, 42 and 43. Consequently, the current flow through the space discharge devices 41, 42 and 43 and the direct current windings of the reactance elements 38, 39 and 40 is reduced to increase the impedance of the reactance elements 38, 39 and 40 and reduce the induction motor action of the interlocked motors. The reduction in the current flow through the regulating field winding 18 which is caused by the condenser 55 and resistance element 56 operating on the grid of the rectifier tube 28 also serves to control the induction motor action of the interlocked motors by the space discharge tubes 41, 42 and 43. The stabilizing action of the condenser 45 and the resistance element 56 on the control system is fully described in the patent to H. M. Stoller No. 1,662,085 and a further description here is deemed unnecessary.

After the system is operating the motors at normal speed, the induction motor operation of the interlocked motors will depend upon the current flow through the resistance elements 35, 36 and 37 which is under the control of the reactance elements 38, 39 and 40. The reactance elements 38, 39 and 40 are controlled by the space discharge tubes 41, 42 and 43 according to the current flow through the regulating field winding 18 of the motor 11. In case a light load is placed upon the interlocked motors, the propelling motor 11 will tend to run faster. The increased speed of the propelling motor 11 is prevented by increasing the current flow through the regulating field winding 18. The increased current flow through the regulating field winding 18 reduces the current flow through the space discharge devices 41, 42 and 43, and the direct current windings of the reactance elements 38, 39 and 40. Consequently the current flow through the resistance elements 35, 36 and 37 is reduced to lower the induction motor action of the interlocked motors. In case the interlocked motors are carrying a relatively heavy load, then the propelling motor 11 will tend to run slow. To prevent the lowering of the speed of the propelling motor the control system 12 lowers the current flow through the regulating field winding 18. The reduction in the current flow through the field winding 18 lowers the negative potential impressed on the grids of the space discharge tubes 41, 42 and 43. Consequently, current flow through the space discharge tubes 41, 42 and 43 and the direct current windings of the reactance elements 38, 39 and 40 is increased to increase the current flow through the resistance elements 35, 36 and 37. This increases the induction motor action of the interlocked motors to lighten the load on the propelling motor 11.

In operating the system it is desirable to employ a relatively strong shunt field on the propelling motor 11 in order that the motor may effect dynamic braking or generator action to restrain the entire interlocked system from runaway tendencies in the case of minimum load conditions.

Modifications in the system and arrangement and location of parts may be made within the spirit and scope of the inventon and such modifications are intended to be covered by the appended claims.

What is claimed is:

1. In a control system, a plurality of alternating current dynamo-electric machines, means for electrically interlocking said machines to effect synchronous rotation of all machines in accordance with rotative movement of one machine, control means for rotating one of said machines at constant speed, impedance means for effecting induction motor operation of said machines and means for varying said impedance means according to the operation of said control means.

2. In a control system, a plurality of alternating current dynamo-electric machines, means for electrically interlocking said machines to effect synchronous rotation of all machines in accordance with the rotative movement of one machine, a constant speed motor for rotating one of said machines, impedance means for effecting induction motor operation of said machines and means for varying said impedance means to an extent dependent on the operation of said motor.

3. In a control system, a plurality of alternating current dynamo-electric machines, means for electrically interlocking said machines to effect synchronous rotation of all machines in accordance with the rotative movement of one machine, a motor for rotating one of said machines, control means for operating said motor at constant speed, impedance means for effecting induction motor operation of said machines, and means automatically governed by said control means for controlling said impedance means.

4. In a control system, a plurality of alternating current machines having stator and rotor windings, means for connecting said windings to effect synchronous movement of all rotors in accordance with the movement of any rotor, a motor having a regulating field winding for operating one of said rotors, means for controlling said field winding to maintain the motor speed constant, impedance means connected to windings of said machines for operating the machines as induction motors, and means controlled according to the energization of said field winding for governing said impedance means to control the induction motor action of the machines.

5. In a control system, a plurality of dynamo-electric machines, means for electrically interlocking said machines to effect synchronous rotation of all machines in accordance with the rotative movement of one machine, a constant speed motor for rotating one machine to effect constant speed operation of all machines, and means for operating said machines as induction motors to carry a portion of the load of said motor and for automatically varying the induction motor action according to the load on the motor.

6. In a control system, a plurality of alternating current machines having stator windings connected in parallel to a source of alternating current and rotor windings connected together in parallel, control means for rotating the rotor of one machine at constant speed to synchronously rotate the rotors of all machines at constant speed, resistance elements connected in parallel to said rotor windings to operate the machines as induction motors, and means for automatically varying the current flow through said resistance elements according to the operation of said control means to govern the induction motor action.

7. In a control system, a plurality of alternating current machines having stator and rotor windings, means for connecting said windings to effect synchronous movement of all rotors in accordance with the movement of one rotor, control means for operating one of said rotors, impedance means connected to said windings for effecting operation of said machines as induction motors, and means for automatically governing said impedance means according to the operation of said control means.

8. In a control system, a plurality of alternating current machines having connected stator windings and connected rotor windings, control means for rotating the rotor of one machine at constant speed to synchronously rotate the rotors of all the machines at constant speed, and means for automatically varying the impedance of the rotor winding circuit according to the operation of said control means to operate the machines as induction motors and to control the induction motor action.

9. In a control system, a plurality of alternating current machines having stator and rotor windings, means for connecting said windings to effect synchronous movement of all rotors in accordance with the movement of one rotor, control means for operating one of said rotors at constant speed, resistance elements connected in parallel to said rotor windings to operate the machines as induction motors, reactance means for governing the current flow through said resistance elements, and means for automatically governing said reactance means according to the operation of said control means.

10. In a control system, a plurality of alternating current machines having stator windings connected in parallel to a source of alternating current and rotor windings connected together in parallel, a propelling motor for operating one of said rotors to synchronously rotate all of said rotors, a regulating field winding for controlling said motor, control means for governing the current flow through said field winding to maintain the motor speed constant, resistance elements connected in parallel to said rotor windings to operate the machines as induction motors, reactance means for governing the current flow through said resistance elements, and means automatically controlled according to the potential across said regulating field winding for governing said reactance means to control the resistance of said resistance element and the induction motor action of said machines.

11. In a control system, a plurality of alternating current machines adapted to be connected to a source of alternating current and having stator and rotor windings, means for connecting said rotor windings together and for connecting said stator windings together whereby movement of one machine effects synchronous movement of all machines, control means for rotating one machine at constant speed to rotate all machines synchronously at constant speed and means for varying the impedance in certain of said windings according to the operation of said control means to operate the machines as induction motors and to control the induction motor action.

12. In a control system, a plurality of polyphase dynamo-electric machines having rotor and stator windings, a source of polyphase current connected to said machines, means for connecting said rotor windings together and for connecting said stator windings together whereby movement of one machine effects synchronous movement of all machines, constant speed means for rotating one machine at constant speed to rotate all the machines synchronously at constant speed, impedance means connected to certain of the machine windings for operating the machines as induction motors, and means for varying said impedance means according to the operation of said constant speed means to control the inductance motor action of the machines.

13. In a control system, a plurality of alternating current machines having stator and rotor windings, means for connecting said windings to effect synchronous movement of all rotors in accordance with the movement of one rotor, a motor having a regulating field winding for operating one machine rotor, circuits for controlling said field winding to maintain the speed of said motor constant, resistance elements connected in parallel to said rotor windings to operate the machines as induction motors, inductive impedance elements connected in series with said resistance elements for controlling the current flow therethrough, each of said inductive impedance elements comprising alternating current and direct current windings mounted on the same core member with the alternating current windings in series with said resistance elements, and three element space discharge devices having negative potential impressed on the grids thereof according to the potential across said field winding for varying the energization of the direct current windings of said inductive impedance elements to control the induction motor action of said machines.

In witness whereof, I hereunto subscribe my name this 18th day of November, 1930.
EDMUND R. MORTON.